US011447580B2

(12) United States Patent
Sumerin et al.

(10) Patent No.: US 11,447,580 B2
(45) Date of Patent: Sep. 20, 2022

(54) ZIEGLER-NATTA CATALYST AND PREPARATION THEREOF

(71) Applicant: BOREALIS AG, Vienna (AT)

(72) Inventors: Victor Sumerin, Porvoo (FI); Georgy Kipiani, Porvoo (FI)

(73) Assignee: Borealis AG, Vienna (AT)

(*) Notice: Subject to any disclaimer, the term of this patent is extended or adjusted under 35 U.S.C. 154(b) by 0 days.

(21) Appl. No.: 16/771,305

(22) PCT Filed: Dec. 27, 2018

(86) PCT No.: PCT/EP2018/086893
§ 371 (c)(1),
(2) Date: Jun. 10, 2020

(87) PCT Pub. No.: WO2019/129797
PCT Pub. Date: Jul. 4, 2019

(65) Prior Publication Data
US 2021/0002390 A1 Jan. 7, 2021

(30) Foreign Application Priority Data
Dec. 27, 2017 (EP) .................................... 17210671

(51) Int. Cl.
C08F 4/52 (2006.01)
C08F 4/64 (2006.01)
C08F 4/02 (2006.01)
C08F 2/06 (2006.01)
C08F 2/34 (2006.01)
C08F 210/02 (2006.01)
C08F 210/08 (2006.01)
C08F 210/16 (2006.01)
C08F 4/649 (2006.01)
C08F 4/654 (2006.01)

(52) U.S. Cl.
CPC .............. C08F 4/022 (2013.01); C08F 2/06 (2013.01); C08F 2/34 (2013.01); C08F 4/6494 (2013.01); C08F 4/6543 (2013.01); C08F 210/02 (2013.01); C08F 210/08 (2013.01); C08F 210/16 (2013.01)

(58) Field of Classification Search
CPC .............................. C08F 4/6543; C08F 4/6494
See application file for complete search history.

(56) References Cited

U.S. PATENT DOCUMENTS

| 3,219,652 | A | * | 11/1965 | Hill | .................. | C08F 10/00 526/142 |
| 4,071,674 | A | | 1/1978 | Kashiwa et al. | | |
| 4,399,054 | A | | 8/1983 | Ferraris et al. | | |
| 4,525,555 | A | * | 6/1985 | Tajima | ................... | C08F 10/00 502/122 |
| 4,665,208 | A | | 5/1987 | Wellborn et al. | | |
| 4,874,734 | A | | 10/1989 | Kioko et al. | | |
| 4,908,463 | A | | 3/1990 | Bottelberghe | | |
| 4,924,018 | A | | 5/1990 | Bottelberghe | | |
| 4,952,540 | A | | 9/1990 | Kioka et al. | | |
| 4,968,827 | A | | 11/1990 | Davis | | |
| 5,055,535 | A | | 10/1991 | Spitz et al. | | |
| 5,091,352 | A | | 2/1992 | Kioka et al. | | |
| 5,103,031 | A | | 4/1992 | Smith | | |
| 5,157,137 | A | | 10/1992 | Sangokoya | | |
| 5,206,199 | A | | 2/1993 | Kioka et al. | | |
| 5,200,502 | A | * | 4/1993 | Kao | ......................... | C08F 6/02 528/494 |
| 5,204,419 | A | | 4/1993 | Tsutsui et al. | | |
| 5,231,153 | A | * | 7/1993 | Hsu | ....................... | C08F 236/10 526/181 |
| 5,235,081 | A | | 8/1993 | Sangokoya | | |
| 5,248,801 | A | | 9/1993 | Sangokoya | | |
| 5,308,815 | A | | 5/1994 | Sangokoya | | |
| 5,329,032 | A | | 7/1994 | Tran et al. | | |
| 5,391,529 | A | | 2/1995 | Sangokoya | | |
| 5,391,793 | A | | 2/1995 | Marks et al. | | |
| 5,672,669 | A | | 9/1997 | Wasserman et al. | | |
| 5,674,795 | A | | 10/1997 | Wasserman et al. | | |
| 5,693,838 | A | | 12/1997 | Sangokoya | | |
| 5,731,253 | A | | 3/1998 | Sangokoya | | |

(Continued)

FOREIGN PATENT DOCUMENTS

| CN | 101389663 A | 3/2009 |
| CN | 102388070 A | 3/2012 |

(Continued)

OTHER PUBLICATIONS

Alt et al., "Bimodal polyethylene-Interplay of catalyst and process", Macromol. Symp. pp. 135-143 (2001).
International Search Report and Written Opinion dated Apr. 29, 2019 in International Application No. PCT/EP2018/086893 (11 pages).
International Search Report and Written Opinion dated Apr. 3, 2019 from International Application PCT/EP2018/086242, 12 pages.
International Search Report and Written Opinion dated Apr. 5, 2019, from International Application No. PCT/EP2018/085992, 14 pages.

(Continued)

Primary Examiner — Rip A Lee
(74) Attorney, Agent, or Firm — Meunier Carlin & Curfman LLC

(57) ABSTRACT

This invention relates to a solid MgCb-based Natta catalyst component comprising a $C_2$ to $C_6$ alkyl tetrahydrofurfuryl ether as internal electron donor for producing olefin polymers and preparation of said catalyst component. Further, the invention relates to a Ziegler-Natta catalyst comprising said solid catalyst component, Group 13 metal compound as co-catalyst and optionally external additives. The invention further relates to the use of said catalyst component in producing olefin polymers, especially ethylene copolymers.

32 Claims, 1 Drawing Sheet

(56) References Cited

U.S. PATENT DOCUMENTS

| | | | |
|---|---|---|---|
| 5,731,451 A | 3/1998 | Smith et al. | |
| 5,744,656 A | 4/1998 | Askham | |
| 6,693,160 B1* | 2/2004 | Halasa | C08F 236/10 |
| | | | 526/258 |
| 7,341,971 B2 | 3/2008 | Denifl et al. | |
| 8,575,283 B1* | 11/2013 | Fang | C08F 4/52 |
| | | | 526/125.3 |
| 8,604,143 B2* | 12/2013 | Wang | C08F 36/08 |
| | | | 526/124.3 |
| 9,200,094 B2* | 12/2015 | Brita | C08F 10/00 |
| 9,593,178 B2* | 3/2017 | Brita | C08F 10/00 |
| 9,920,149 B2* | 3/2018 | Steinhauser | C08L 25/10 |
| 10,118,977 B2* | 11/2018 | Sumerin | C08F 210/16 |
| 10,351,641 B2* | 7/2019 | Brita | C08F 110/06 |
| 10,457,758 B2* | 10/2019 | Jayaratne | C08F 210/16 |
| 10,752,721 B2* | 8/2020 | Janowski | C08F 297/044 |
| 2007/0021295 A1* | 1/2007 | Morini | C08F 210/16 |
| | | | 502/103 |
| 2007/0049711 A1 | 3/2007 | Kuo et al. | |
| 2011/0245070 A1* | 10/2011 | Brita | C08F 110/02 |
| | | | 502/172 |
| 2012/0329963 A1* | 12/2012 | Brita | C08F 10/00 |
| | | | 526/125.8 |
| 2013/0289229 A1 | 10/2013 | Castro et al. | |
| 2014/0378631 A1* | 12/2014 | Brita | C08F 210/02 |
| | | | 526/125.3 |

FOREIGN PATENT DOCUMENTS

| | | |
|---|---|---|
| CN | 102453168 A | 5/2012 |
| CN | 20284496 U | 4/2013 |
| CN | 103180348 B | 8/2015 |
| CN | 204699418 U | 10/2015 |
| CN | 103752431 B | 12/2015 |
| CN | 104492108 B | 6/2016 |
| DE | 19617924 A1 | 11/1997 |
| DE | 2019739747 A1 | 3/1999 |
| EP | 0376936 A2 | 4/1990 |
| EP | 0424049 A2 | 10/1991 |
| EP | 0424049 A2 | 4/1992 |
| EP | 0561476 A1 | 9/1993 |
| EP | 0428054 B1 | 1/1994 |
| EP | 0594218 A1 | 4/1994 |
| EP | 0279586 B1 | 5/1994 |
| EP | 0688794 B1 | 12/1995 |
| EP | 0614467 B1 | 2/1996 |
| EP | 0376936 A3 | 4/1996 |
| EP | 0537130 B1 | 9/1996 |
| EP | 0591224 B1 | 2/1998 |
| EP | 0655073 B1 | 12/1998 |
| EP | 1057523 A1 | 6/2000 |
| EP | 1057523 B1 | 2/2004 |
| EP | 0810235 B1 | 11/2004 |
| EP | 042310 B2 | 5/2006 |
| EP | 1803743 A1 | 7/2007 |
| EP | 2065405 A1 | 6/2009 |
| EP | 2186832 A1 | 5/2010 |
| EP | 2386582 A1 | 11/2011 |
| EP | 2532687 A2 | 12/2012 |
| EP | 2600130 B1 | 2/2016 |
| EP | 2746306 B1 | 10/2017 |
| GB | 2167763 B | 6/1986 |
| WO | 1992/012182 A1 | 7/1992 |
| WO | 1992021705 A1 | 12/1992 |
| WO | 199401080 A1 | 5/1994 |
| WO | 1996/018662 A1 | 6/1996 |
| WO | 1997010248 A1 | 3/1997 |
| WO | 1997028170 A1 | 8/1997 |
| WO | 199804033 A1 | 9/1998 |
| WO | 1998046616 A1 | 10/1998 |
| WO | 1998049208 A1 | 11/1998 |
| WO | 1998056831 A1 | 12/1998 |
| WO | 1998058975 A1 | 12/1998 |
| WO | 1999010353 A1 | 3/1999 |
| WO | 1999012981 A1 | 3/1999 |
| WO | 1999019335 A1 | 4/1999 |
| WO | 1999041290 A1 | 8/1999 |
| WO | 1999051646 | 10/1999 |
| WO | 2000008034 A1 | 2/2000 |
| WO | 200003434 A1 | 6/2000 |
| WO | 2001/055230 A1 | 8/2001 |
| WO | 2001070395 A2 | 9/2001 |
| WO | 2002002576 A1 | 1/2002 |
| WO | 2003000754 A1 | 1/2003 |
| WO | 2003000757 A1 | 1/2003 |
| WO | 2003051934 A2 | 6/2003 |
| WO | 2004029112 A1 | 4/2004 |
| WO | 2004/055065 A1 | 7/2004 |
| WO | 2005105863 A2 | 11/2005 |
| WO | 2005/118655 A1 | 12/2005 |
| WO | 2006/063771 A1 | 6/2006 |
| WO | 2006069733 A1 | 7/2006 |
| WO | 2006097497 A1 | 9/2006 |
| WO | 2007/051607 A1 | 5/2007 |
| WO | 2007/096255 A1 | 8/2007 |
| WO | 2007107448 A1 | 9/2007 |
| WO | 2007116034 A1 | 10/2007 |
| WO | 2007137849 A1 | 12/2007 |
| WO | 2007137853 A1 | 12/2007 |
| WO | 2009027075 A2 | 3/2009 |
| WO | 2009054832 A1 | 4/2009 |
| WO | 2010125018 A1 | 11/2010 |
| WO | 2011076443 A1 | 6/2011 |
| WO | 2011076618 A1 | 6/2011 |
| WO | 2011138211 A1 | 11/2011 |
| WO | 2012001052 A2 | 1/2012 |
| WO | 2012007430 A1 | 1/2012 |
| WO | 2012143303 A1 | 10/2012 |
| WO | 2013007650 A1 | 1/2013 |
| WO | 2013070601 A2 | 5/2013 |
| WO | 2013098137 A1 | 7/2013 |
| WO | 2013098138 A1 | 7/2013 |
| WO | 2013098149 A1 | 7/2013 |
| WO | 2014/004396 A1 | 1/2014 |
| WO | 2015062936 A1 | 5/2015 |
| WO | 2016/097193 A1 | 6/2016 |
| WO | 2016145179 A1 | 9/2016 |

OTHER PUBLICATIONS

Binks, Bernard P and Andrew T. Tyowua. "Oil-in-oil emulsions stabilized solely by solid particles." Soft Matter 12.3 (2016):876-887.

Chevalier, Yves, and Marie-Alexandrine Bolzinger. "Emulsions stabilized with solid nanoparticles: Pickering emulsions." Colloids and Surfaces A: Physiochemical and Engineering Aspects 439 (2013): 23-24.

Britovsek, George JP, Vernon C. Gibson, and Duncan F. Wass. "The search for new-generation olefin polymerization catalysts: life beyond metallocenes." Angewandte Chemie International Edition 38.4 (1999): 428:447.

Enders et al., "Die fluorige Phase: Organische Chemie mit hochfluorierten Reagenzien and Losungsmitteln", Chemie in unserer Zeit, Jahrg., 2000, 6, 34, 382-393.] English Abstract included.

Nostro, Pierandrea Lo. "Phase separation properties of fluorocarbons, hydrocarbons and their copolymers." Advances in colloid and interface science 56 (1995): 245-287.

Atwood, "Anionic and Cationic Organoaluminum Compounds" Coord. Chem. Alum., 1993, 197-32.

Holbrey, John D., et al. "Liquid clathrate formation in ionic liquid-aromatic mixtures." Chemical Communications 4 (2003): 476-477.

Scott K. Spear, "Liquid Clathrates", Encyclopedia of Supramolecular Chemistry, 2001, 804-807.

Non-Final Office Action issued in U.S. Appl. No. 16/771,307 dated Oct. 18, 2021.

Notice of Allowance issued in U.S. Appl. No. 16/771,307 dated Mar. 1, 2022.

* cited by examiner

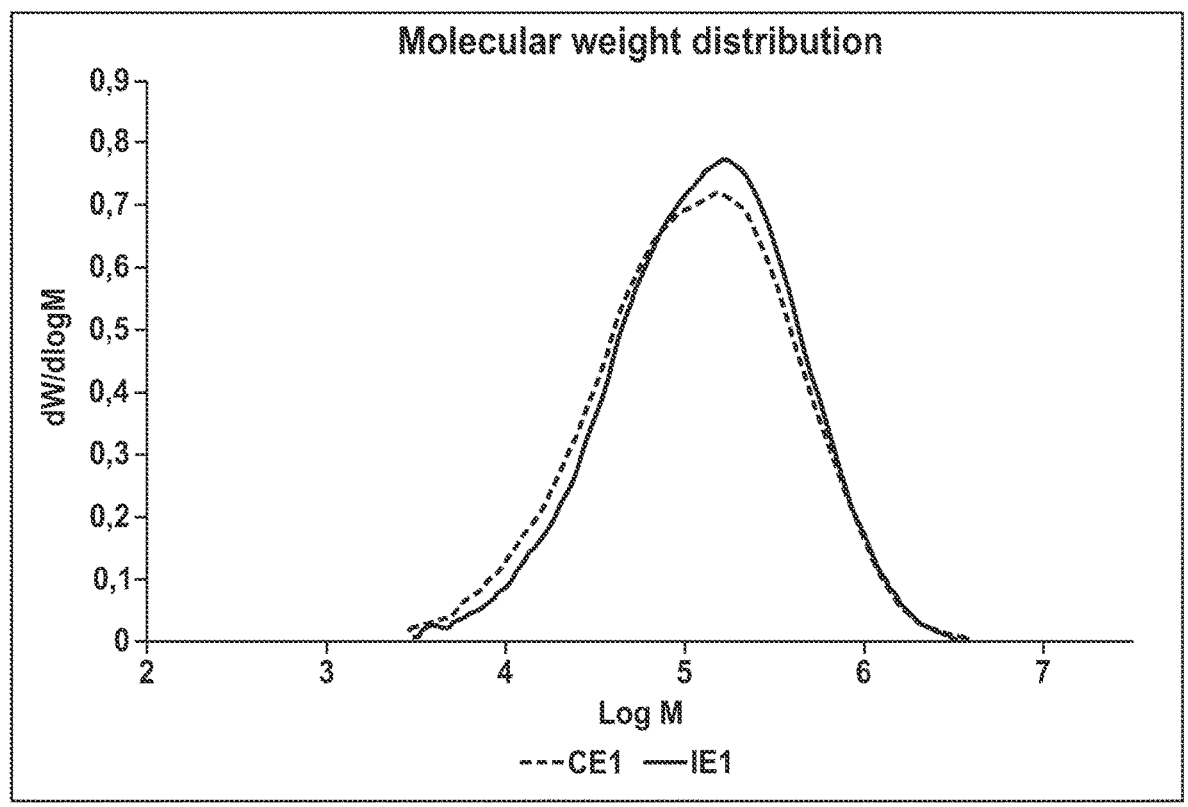

ZIEGLER-NATTA CATALYST AND PREPARATION THEREOF

This invention relates to a solid Ziegler-Natta catalyst component for producing olefin (co)polymers and preparation of said catalyst component. Further, the invention relates to a Ziegler-Natta catalyst comprising said solid catalyst component, Group 13 metal compound as co-catalyst and optionally an external electron donor. The invention further relates to the use of said catalyst component in producing olefin (co)polymers, especially ethylene (co)polymers with desired properties.

BACKGROUND OF THE INVENTION

Ziegler-Natta (ZN) type polyolefin catalysts are well known in the field of producing olefin polymers, like ethylene (co)polymers. Generally, the catalysts comprise at least a catalyst component formed from a compound of a transition metal of Group 4 to 6 of the Periodic Table (IUPAC, Nomenclature of Inorganic Chemistry, 1989), a compound of a metal of Group 1 to 3, optionally a compound of Group 13 metal, and optionally, an internal organic compound, like an internal electron donor. A ZN catalyst may also comprise further catalyst component(s), such as a co-catalyst and optionally external additives, such as an external electron donor.

A great variety of Ziegler-Natta catalysts have been developed to fulfil the different demands in reaction characteristics and producing poly(alpha-olefin) resins of desired physical and mechanical performance. Typical Ziegler-Natta catalysts contain a magnesium compound, a titanium compound and optionally an aluminium compound supported on a particulate support. The commonly used particulate supports are inorganic oxide type of supports, such as silica, alumina, titania, silica-alumina and silica-titania, typically silica.

The catalyst can be prepared by sequentially contacting the carrier with the compounds mentioned above, for example, as described in EP 688794 and WO 99/51646. Alternatively, a catalyst component may be prepared by preparing first a solution from the components and then contacting the solution with a carrier, as described in WO 01/55230.

Another group of typical Ziegler-Natta catalysts is a magnesium dihalide, typically $MgCl_2$, based catalyst that contain a titanium compound and optionally a Group 13 compound, for example, an aluminium compound. Such catalysts are disclosed e.g. in EP376936, WO 2005/118655 and EP 810235. The ZN-catalysts described above disclosed to be useful in olefin polymerisation, for example for production of ethylene (co)polymers.

However, even though many catalysts of prior art show satisfactory properties for many applications, there has been the need to modify and improve the properties and performance of the catalysts to achieve desired polymer properties and to have catalysts with desired performance in desired polymerisation processes.

Hydrogen and comonomer responses and thus catalyst flexibility as regards to possibilities to control the molecular weight (Mw), polymer molecular weight distribution (MWD) and comonomer content are general indicators of the catalyst performance. Thus, problems relating to these properties indicate performance properties of the catalysts. Further, it's known that if high molecular weight polymer is desired, and the hydrogen amount cannot be reduced anymore, then external additives can be used in the polymerisation. However, in that case polymers are often produced at the expense of the catalyst productivity. There have been several attempts to find solutions by modifying the catalyst. One way to modify the catalyst is to use internal organic compounds. However, even if e.g. the molecular weight of the polymer is improved, often it happens at the cost of some other properties, usually catalyst productivity and comonomer response (pages 135-143 by Alt et al. "Bimodal polyethylene-Interplay of catalyst and process" in Macromol. Symp. 2001, 163). Internal organic compounds can be internal electron donors or other compounds affecting the performance of the catalyst, and external additives comprise e.g. external electron donors and/or alkyl halides.

U.S. Pat. No. 5,055,535 discloses a method for controlling the molecular weight distribution (MWD) of polyethylene homopolymers and copolymers using a ZN catalyst comprising an electron donor selected from monoethers (e.g. tetrahydrofuran). The monoether is added to the catalytic component in the presence of the co-catalyst and is further characterised that under no circumstance should the monoethers be brought into contact with the catalytic component without the presence of the co-catalyst in the medium.

WO 2007051607 A1 suggests the possibility of tailoring the properties of a multimodal ethylene polymer by using alkyl ether type internal electron donor, preferably tetrahydrofuran, to modify ZN catalyst component to influence the molecular weight distribution (MWD) of a higher molecular weight (HMW) component.

WO2007096255A1 describes ZN catalysts with 1,2-diethers of formula $R_aCR_1(OR_4)$—$CR_2R_3(OR_5)$ as internal donors, where $R_a$ is a methyl group or hydrogen or is condensed with $R_4$ to form a cycle, $R_1$, $R_2$ and $R_3$ are, independently hydrogen or C1-C20 hydrocarbon groups, possibly containing heteroatoms, $R_4$ and $R_5$ are C1-C20 alkyl groups, or ROCO— groups where RO is a C1-C20 alkyl group, or they can be joined with R and $R_3$ respectively to form a cycle, with the proviso that when $R_a$ is hydrogen, $R_4$ and $R_5$ are not simultaneously methyl, and when $R_a$ and $R_4$ form a cycle, $R_5$ is C1-C20 alkyl group.

WO2004055065 discloses solid catalyst component comprising Ti, Mg, halogen and electron donor in specific molar ratios for preparation copolymers of ethylene with α-olefins, where said α-olefins are homogeneously distributed along the polymer chains. The electron donor (ED) is preferably ether, like tetrahydrofuran. Said catalyst component is used in polymerisation together with alkylaluminium compound and optionally with external electron donor. The optional external electron donor is said to be equal to or different from the ED used in the catalyst component.

EP0376936 discloses a $MgCl_2$ supported ZN catalyst, where spray-dried $MgCl_2$/alcohol carrier material is treated with a compound of group IA to IIIA (Groups 1, 2 and 13 of the Periodic Table (IUPAC, Nomenclature of Inorganic Chemistry, 1989)), then titanated with a titanium compound, optionally in the presence of internal electron donor. The optional internal donor compound is added together with $TiCl_4$ or after adding $TiCl_4$. The optional internal donor compound, when used in examples, was THF or di-isobutyl phthalate.

However, the activity of the donor-modified catalysts of EP0376936 was much lower than the original catalyst without the donor. Moreover, during the donor treatment step, a 10 wt % solution of triethylaluminium and a number of hydrocarbon washings were used, which resulted in a large amount of organic solvent waste.

WO 2014004396 A1 discloses a catalyst component, where bi-heterocyclic compounds are used as internal or external donor. The catalyst is used for propylene polymerisation.

EP 2746306 discloses a supported Ziegler-Natta catalyst component comprising an internal electron donor selected from bi-cyclic ethers. The catalyst of EP 2746306 is prepared by depositing a soluble alkoxy compound of Group 1 to 3 metal, a compound of Group 13 metal, an internal electron donor and a transition metal compound of Group 4 to 6 on a particulate support, or alternatively forming precipitated support material by contacting a soluble magnesium alkoxide compound, an electron donor solution and a solution of alkylaluminium chloride compound. After precipitation and suitable washing steps, the obtained solid support material was treated with a titanium compound to obtain the catalyst component. In this case, the molecular weight of the polymer is improved at the cost of catalyst productivity. Moreover, catalyst performance and morphology of precipitated $MgCl_2$ based catalysts are typically sensitive to even small variations in preparation conditions, especially in large-scale production.

WO2016097193 discloses preparation of $MgCl_2$ supported catalyst component, where as an internal electron donor is used bi-cyclic ethers. As a benefit, it is disclosed that the molecular weight distribution (MWD) of the polymer can be narrowed, while keeping the activity on a good level.

Although much development work in Ziegler-Natta catalyst preparation has been done, there is still some room for improvement. As stated above, some of the methods are particularly sensitive to preparation conditions and/or large amounts of waste material is formed, which are disadvantages in preparing catalyst at a large scale. Modifications of the catalyst synthetic procedure may adversely affect the productivity of the subsequent catalyst so as not be satisfactory for commercial scale production. Additionally, catalyst morphology can be difficult to control, especially in a large-scale production. In addition to the needs of catalyst properties and performance, catalyst preparation at commercial-scale should be as simple and robust as possible. Further, the chemicals used in the preparation should be viewed as safe from a health, safety and environment point of view.

Many of the desires tasks are achievable by using the catalyst as described in WO2016097193.

However, in addition to the desired tasks as indicated above, there is still some room for improving the balance between activity and hydrogen response of the catalyst, while keeping narrow molecular weight distribution and homogeneous comonomer distribution.

Accordingly, it is desired to provide a catalyst, which is able to produce copolymers with wider melt flow rate (MFR) and density windows, such that there is the possibility to produce high molecular weight copolymers with narrow MWD (molecular weight distribution) and high comonomer content combined with low melting temperature (homogeneous comonomer distribution). And finally, the catalyst should have productivity on a level, which makes it useful in commercial polymerisation processes while producing a broad range of molecular weight polymers.

Moreover, it is desired to find method to prepare the catalyst component with a robust method that allows production of the catalyst in a large scale, which method is less sensitive towards morphology changes along changes in conditions and chemicals during catalyst preparation. Further, it is desired that large amounts of waste material during the synthesis can be avoided.

Further, the catalyst of the invention should provide good co-monomer response and desired narrow MWD of the polymer.

Based on the teachings of prior art, it appears that donor modification might result in the improvement of some properties. However, very often these improvements are made at the cost of catalyst productivity and co-monomer response. In addition, $MgCl_2$ based catalysts prepared by precipitation methods are typically sensitive towards changes in preparation conditions.

SUMMARY OF THE INVENTION

It has now been surprisingly found that the problems of the prior art can be solved, when a solid $MgCl_2$ based catalyst component modified with a specific internal electron donor and prepared by a defined method as described below is used in olefin polymerisation.

Thus, the object of the present invention is to provide a method for preparing a solid $MgCl_2$ based catalyst component. The present invention relates also to a solid $MgCl_2$ based catalyst component and a solid $MgCl_2$ based catalyst component prepared by the inventive method. Further, the invention relates to a catalyst comprising said solid $MgCl_2$ based catalyst component, a co-catalyst and optionally an external additive, especially an external electron donor. An additional object of the present invention is the use of the solid $MgCl_2$ based catalyst component of the invention and/or prepared by the method of the invention in olefin polymerisation process.

In the present disclosure, the term internal organic compound covers, but is not restricted to, internal electron donors, which phrase is widely used in patent literature. Said internal organic compound denotes a compound being part of the solid catalyst component, i.e. added during the synthesis of the solid catalyst component. External additives cover any additive, covering but not restricted to, external electron donors, and mean a component being not part of the solid catalyst component, but fed as separate component to the polymerisation process.

The phrases carrier and support have the same meaning in the present disclosure.

DESCRIPTIONS OF DRAWINGS

FIG. 1 shows a graph of molecular weight distribution.

DETAILED DESCRIPTION OF THE INVENTION

Accordingly, the present invention relates to a method for producing solid $MgCl_2$ supported catalyst component comprising the steps a) providing solid carrier particles of $MgCl_2*mROH$ adduct b) pre-treating the solid carrier particles of step a) with a compound of Group 13 metal c) treating the pre-treated solid carried particles of step b) with a transition metal compound of Group 4 to 6 d) recovering the solid catalyst component wherein the solid carrier particles are contacted with an internal organic compound of formula (I) or mixtures therefrom before treating the solid carrier particles in step c)

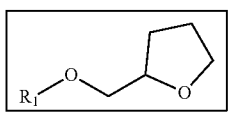

wherein in the formula (I)

$R_1$ is a linear or branched $C_2$ to $C_6$-alkyl group, preferably a linear or branched $C_2$ to $C_4$-alkyl group, most preferably an ethyl group, and R in the adduct $MgCl_2*mROH$ is a linear or branched alkyl group with 1 to 12 C atoms, and m is 0 to 6.

Accordingly, the internal organic compound, typically an internal electron donor, of formula (I) is contacted with the solid carrier particles before treatment of solid carrier particles with the transition metal compound of Group 4 to 6. Thus, said internal organic compound can be contacted with the solid carrier particles before step b), i.e. before pre-treating the solid carrier particles with Group 13 metal compound, or simultaneously with said pre-treatment step, or after step b), but before treating the solid carrier particles with the transition metal compound of Group 4 to 6.

The present invention relates also to the solid catalyst component prepared by the method as described above. Further, the present invention provides a Ziegler-Natta catalyst comprising the solid catalyst component prepared as defined above, a co-catalyst and optionally an external electron donor.

Further, one object of the invention is to use the catalyst in accordance with the present invention in the process for producing ethylene polymers. The catalyst of the present invention or produced by the inventive method is especially suitable for producing ethylene copolymers in a multistage process.

The invention will be described in the following in greater detail, referring to the particular preferred embodiments. Preferred embodiments are described in dependent claims as well as in the following description.

As used herein, the term Ziegler-Natta (ZN) catalyst component is intended to cover a catalyst component comprising a transition metal compound of Group 4 to 6, a compound of a metal of Group 13 of the Periodic Table (IUPAC, Nomenclature of Inorganic Chemistry, 1989) and an internal organic compound supported on $MgCl_2$ based carrier.

Magnesium dihalide is used as a starting material for producing a carrier. The solid carrier used in this invention is a carrier where alcohol is coordinated with Mg dihalide, preferably $MgCl_2$. The Mg dihalide, preferably $MgCl_2$, is mixed with an alcohol (ROH) or a mixture of alcohols and the solid carrier $MgCl_2*mROH$ is formed according to the well know methods. As examples, spray drying or spray crystallisation methods can be used to prepare the carrier. Spherical and granular $MgCl_2*mROH$ carrier materials are suitable to be used in the present invention. The alcohol in producing $MgCl_2*mROH$ carrier material is an alcohol ROH, where R is a linear or branched alkyl group containing 1 to 12 carbon atoms, preferably 1 to 8 carbon atoms, like 1 to 4 carbon atoms or mixtures therefrom. Ethanol is typically used. In $MgCl_2*mROH$, m is 0 to 6, more preferably 1 to 4, especially 2.7 to 3.3.

$MgCl_2*mROH$ is available from commercial sources or can be prepared by methods described in prior art. Preparation methods of $MgCl_2*mROH$ carrier is described in several patents e.g. in EP-A-0376936, EP-A-0424049, EP-A-655073, U.S. Pat. No. 4,071,674 and EP-A-0614467, which are incorporated here by reference. The solid carrier particles of the invention may consist of $MgCl_2*mROH$, which is also called as $MgCl_2*mROH$ adduct.

Group 13 metal compound, used in step b) is preferably an aluminium compound. Particularly preferably the aluminium compound is an aluminium compound of the formula $Al(alkyl)_xX_{3-x}$ (II), wherein each alkyl is independently an alkyl group of 1 to 12 carbon atoms, preferably 1 to 8 carbon atoms, more preferably 1 to 6 carbon atoms, X is halogen, preferably chlorine and $1<x\leq 3$. The alkyl group can be linear, branched or cyclic, or a mixture of such groups.

Preferred aluminium compounds are dialkylaluminium chlorides or trialkylaluminium compounds, for example, dimethylaluminium chloride, diethylaluminium chloride, diisobutylaluminium chloride, and triethylaluminium or mixtures therefrom. Most preferably, the aluminium compound is a trialkylaluminium compound, especially triethylaluminium compound.

The transition metal compound of Group 4 to 6 is preferably a Group 4 transition metal compound or a vanadium compound and is more preferably a titanium compound. Particularly preferably the titanium compound is a halogen-containing titanium compound of the formula $X_yTi(OR^8)_{4-y}$, wherein $R^8$ is a $C_{1-20}$ alkyl, preferably a $C_{2-10}$ and more preferably a $C_{2-8}$ alkyl group, X is halogen, preferably chlorine and y is 1, 2, 3 or 4, preferably 3 or 4 and more preferably 4.

Suitable titanium compounds include trialkoxytitanium monochlorides, dialkoxytitanium dichloride, alkoxytitanium trichloride and titanium tetrachloride. Preferably, titanium tetrachloride is used.

The internal organic compound, preferably the internal electron donor, is selected from 1,2-diether compounds of formula (I)

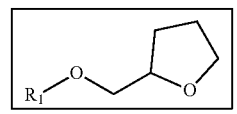

wherein in the formula (I)

$R_1$ is a linear or branched $C_2$ to $C_6$-alkyl group, preferably a linear or branched $C_2$ to $C_4$-alkyl group, i.e. ethyl, n-propyl, i-propyl, n-butyl, sec-butyl, tert-butyl group, and most preferably an ethyl group.

Thus, the internal electron donor is preferably ethyl tetrahydrofurfuryl ether, n-propyl tetrahydrofurfuryl ether, isopropyl tetrahydrofurfuryl ether, n-butyl tetrahydrofurfuryl ether, sec-butyl tetrahydrofurfuryl ether, tert-butyl tetrahydrofurfuryl ether, or is mixtures thereof. Most preferably, the internal electron donor is ethyl tetrahydrofurfuryl ether.

In the $MgCl_2*mROH$ adduct, R is a linear or branched alkyl group with 1 to 12 carbon atoms, preferably 1 to 8 carbon atoms, like 1 to 4 carbon atoms. As alcohol is typically used ethanol, i.e. R is ethyl group and m is 0 to 6, more preferably 1 to 4, especially 2.7 to 3.3.

Thus, most preferably in $MgCl_2*mROH$ adduct R is ethyl and m is 1 to 4, more preferably 2.7 to 3.3. According to the method of the present invention, an essential feature is that the internal organic compound, like an internal electron donor, as defined above, is added to the catalyst mixture before, during or after pre-treating the $MgCl_2*mROH$ with the Group 13 metal compound, but before treating it with the compound of a transition metal of Group 4 to 6.

The molar ratio of the added compound of formula (0/the added MgCl$_2$*mROH adduct to the catalyst mixture is in the range of 0.02 to 0.20 mol/mol, preferably 0.05 to 0.15 mol/mol.

Thus, according to the first preferred embodiment of the invention the solid catalyst component is prepared by
i) providing solid MgCl$_2$*mROH carrier, wherein m is 1 to 4 and R is a linear or branched alkyl group containing 1 to 8 C atoms
ii) pre-treating the solid carrier particles of step i) with an Al compound
iii) adding the internal organic compound of formula (I) into the pre-treated solid carrier of step ii)
Or
iii') simultaneously with step ii) adding the internal organic compound of formula (I) into the solid carrier
iv) treating the pre-treated solid carrier particles of step iii) or iii') with TiCl$_4$ and
v) recovering the solid catalyst component Thus, according to the second preferred embodiment of the invention the solid catalyst component is prepared by
i) providing solid MgCl$_2$*mROH carrier, wherein m is 1 to 4 and R is a linear or branched alkyl group containing 1 to 8 C atoms
ii-1) adding the internal organic compound of formula (I) into the solid carrier of step i)
iii-1) pre-treating the solid carrier particles of step ii-1) with an Al compound
iv-1) treating the pre-treated solid carried particles of step iii-1) with TiCl$_4$ and
v-1) recovering the solid catalyst component.

According to the embodiments above the Al compound can be added to the solid carrier before or after adding the internal organic compound or simultaneously with the internal organic compound to the carrier. The internal organic compound is preferably an internal electron donor.

Most preferably in the first and second embodiments, m is 2.7 to 3.3 and ROH is ethanol in the solid MgCl$_2$*mROH carrier, the aluminium compound is a trialkylaluminium compound, such as triethylaluminium, and as internal electron donor is used ethyl tetrahydrofurfuryl ether.

According to the catalyst preparation method of the present invention the pre-treatment with the Group 13 metal compound, preferably an aluminium compound, can be done by adding a solution of said aluminium compound in inert organic solvent, preferably in inert aliphatic hydrocarbon solvent, for example in heptane. The method of the invention allows also use of a concentrated aluminium compound solution. In the case where triethylaluminium (TEA) is employed, neat TEA or its solutions in an inert hydrocarbon, such as heptane, can be used. It was found that by using the more concentrated solutions, the catalyst morphology remains advantageous and a reduction in waste products is achieved.

The recovered solid catalyst component of the invention shall have Mg/Ti mol/mol ratio of 1 to 10, preferably 2 to 8, especially 3 to 7; Mg/Al ratio of 10 mol/mol and higher, preferably 16 mol/mol and higher; and Cl/Ti mol/mol ratio of 4 to 40, preferably 7 to 30.

Thus, the solid MgCl$_2$ supported catalyst component of the invention comprises Ti, Mg, Al and Cl and an internal organic compound of formula (I), wherein in the formula (I) R$_1$ is a linear or branched C$_2$ to C$_6$-alkyl group, preferably a linear or branched C$_2$ to C$_4$-alkyl group, most preferably an ethyl group; and
wherein the solid catalyst component has Mg/Ti mol/mol ratio of 1 to 10, preferably 2 to 8, Mg/Al ratio of ≥10 mol/mol, preferably ≥16 mol/mol and Cl/Ti mol/mol ratio of 4 to 40, preferably 7 to 30.

Most preferably the solid MgCl$_2$ supported catalyst component of the invention comprises Ti, Mg, Al and Cl and ethyl tetrahydrofurfuryl ether as an internal electron donor; and has Mg/Ti mol/mol ratio of 3 to 7, Mg/Al ratio of ≥16 mol/mol and Cl/Ti mol/mol ratio of 7 to 30.

Mg of the catalyst component preferably originates only from the solid MgCl$_2$*mROH carrier, i.e. no additional Mg compounds are used in the preparation of the catalyst component.

Particles of the solid catalyst component of the invention are uniform in particle size without fines or agglomerates.

It is a further benefit of the invention that the polymer produced by using the catalyst of the invention or prepared by the inventive method has a narrow molecular weight distribution (MWD). Especially the catalyst component of the invention and/or prepared by the method of the invention, i.e. using as internal electron donor a 1,2-diether of formula (I), has an improved "Activity"-"Hydrogen response" balance compared to closest prior art.

Thus, the increase in molecular weight is not made at the expense of the productivity of the catalyst. The productivity is even increased compared to use of a catalyst component of similar type but using a different internal electron donor. Thus, the performance of the catalyst prepared by the method of the present invention makes it possible to further broaden the preparation window of the polyethylene such that polymerisation with both higher and lower amounts of hydrogen is possible while retaining good productivity.

Especially an optimal combination of "Activity"-"Hydrogen response" balance and molar mass variability, MWD, co-monomer response, comonomer composition distribution (CCD) makes the present catalyst very attractive for producing polyethylene.

The catalyst of the invention comprises, in addition to the solid catalyst component as defined above, a co-catalyst, which is also known as an activator. Co-catalysts are organometallic compounds of Group 13 metal, typically aluminium compounds. These compounds include alkylaluminium halides, preferably alkylaluminium chlorides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, triisobutylaluminium, trihexylaluminium and tri-n-octylaluminium. Also, other aluminium alkyl compounds, such as isoprenylaluminium, may be used. Especially preferred co-catalysts are trialkylaluminium compounds, of which triethylaluminium, trimethylaluminium and triisobutylaluminium are particularly used.

The catalyst of the invention may also comprise an external additive, such as external electron donor. Suitable external additives, typically external electron donors, include ether compounds, typically tetrahydrofuran, siloxane or silane type of external donors and/or alkyl halides as is known from prior art.

The catalyst of the present invention can be used for polymerising ethylene optionally with one or more co-monomers. Commonly used co-monomers are alpha-olefin co-monomers preferably selected from C$_3$-C$_{20}$-alpha-olefins, more preferably are selected from C$_4$-C$_{10}$-alpha-olefins, such as 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4-hexadiene, or cyclic olefins, such as norbornene, and any mixtures thereof. Most preferably, the co-monomer is 1-butene and/or 1-hexene.

The catalyst of the present invention allows for the production of a wide range of polyethylene polymers. Thus, production of high density, medium density and low density ethylene polymers is possible.

Catalyst of the present invention can be used in any commonly used uni- and multimodal processes for producing polyethylene. Typically, polyethylene polymers are produced in a multimodal process configuration. The multimodal ethylene copolymer may be produced in any suitable polymerisation process known in the art comprising at least two polymerisation stages. It is preferred to operate the polymerisation stages in cascaded mode. The polymerisations may be operated in slurry, solution, or gas phase conditions or their combinations. Suitable processes comprising cascaded slurry and gas-phase polymerisation stages are disclosed, among others, in WO-A-92/12182 and WO-A-96/18662.

In a multimodal polymerisation configuration, the polymerisation stages comprise polymerisation reactors selected from slurry and gas phase reactors. In one preferred embodiment, the multimodal polymerisation configuration comprises at least one slurry reactor, in some embodiment two slurry reactors followed by at least one gas phase reactor, preferably one gas phase reactor.

The catalyst may be transferred into the polymerisation process by any means known in the art. It is thus possible to suspend the catalyst in a diluent and maintain it as homogeneous slurry. Especially preferred is to use oil having a viscosity from 20 to 1500 mPa·s as diluent, as disclosed in WO-A-2006/063771. It is also possible to mix the catalyst with a viscous mixture of grease and oil and feed the resultant paste into the polymerisation zone. Further still, it is possible to let the catalyst settle and introduce portions of thus obtained catalyst mud into the polymerisation zone in a manner disclosed, for instance, in EP-A-428054.

The polymerisation in slurry usually takes place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerisation is typically from 40 to 115° C., preferably from 60 to 110° C. and in particular from 70 to 100° C. The pressure is from 1 to 150 bar, preferably from 10 to 100 bar.

The slurry polymerisation may be conducted in any known reactor used for slurry polymerisation. Such reactors include a continuous stirred tank reactor and a loop reactor. It is especially preferred to conduct the polymerisation in loop reactor. Hydrogen is fed, optionally, into the reactor to control the molecular weight of the polymer as known in the art. Furthermore, one or more alpha-olefin co-monomers may be added into the reactor to control the density and morphology of the polymer product. The actual amount of such hydrogen and co-monomer feeds depends on the desired melt index (or molecular weight) and density (or co-monomer content) of the resulting polymer.

The polymerisation in gas phase may be conducted in a fluidised bed reactor, in a fast fluidised bed reactor or in a settled bed reactor or in any combination of these.

Typically, the fluidised bed or settled bed polymerisation reactor is operated at a temperature within the range of from 50 to 100° C., preferably from 65 to 90° C. The pressure is suitably from 10 to 40 bar, preferably from 15 to 30 bar.

Also, antistatic agent(s) may be introduced into the slurry and/or gas phase reactor if needed. The process may further comprise pre- and post-reactors.

The polymerisation steps may be preceded by a pre-polymerisation step. The pre-polymerisation step may be conducted in slurry or in gas phase. Preferably, pre-polymerisation is conducted in slurry, and especially in a loop reactor. The temperature in the pre-polymerisation step is typically from 0 to 90° C., preferably from 20 to 80° C. and more preferably from 30 to 70° C.

The pressure is not critical and is typically from 1 to 150 bar, preferably from 10 to 100 bar.

The polymerisation may be carried out continuously or batch wise, preferably the polymerisation is carried out continuously.

A preferred multistage process for producing ethylene (co)polymers according to the invention comprises a slurry-phase polymerisation stage and a gas-phase polymerisation stage. Each stage can comprise one or more polymerisation reactors. One suitable reactor configuration comprises one to two slurry reactors, preferably loop reactors and one gas phase reactor. Such polymerisation configuration is described e.g. in patent literature, such as in WO-A-92/12182 and WO-A-96/18662 of Borealis and known as Borstar technology.

Experimental Part

Methods

ICP Analysis (Al, Mg, Ti)

The sample consisting of dry catalyst powder is mixed so that a representative test portion can be taken. Approximately 20-50 mg of sample is sampled in inert atmosphere into a 20 ml volume crimp cap vial and exact weight of powder recorded.

A test solution of known volume (V) is prepared to a volumetric flask. Sample digestion is performed in the cooled vial by adding a small amount of freshly distilled (D) water (5% of V) followed by concentrated nitric acid ($HNO_3$, 65%, 5% of V). The mixture is transferred to the volumetric flask. The solution diluted with D water up to the final volume, V, and left to stabilise for two hours.

The elemental analysis of the aqueous samples is performed at room temperature using a Thermo Elemental iCAP 6300 Inductively Coupled Plasma-Optical Emission Spectrometer (ICP-OES). The instrument is calibrated for Al, Ti and Mg using a blank (a solution of 5% $HNO_3$) and six standards of 0.5 ppm, 1 ppm, 10 ppm, 50 ppm, 100 ppm and 300 ppm of Al, Ti and Mg in solutions of 5% $HNO_3$ DI water. Curvelinear fitting and 1/concentration weighting is used for the calibration curve.

Immediately before analysis the calibration is verified and adjusted (instrument function named 'reslope') using the blank and a 300 ppm Al, 100 ppm Ti, Mg standard. A quality control sample (QC; 20 ppm Al and Ti, 50 ppm Mg in a solution of 5% $HNO_3$ in DI water) is run to confirm the reslope. The QC sample is also run after every $5^{th}$ sample and at the end of a scheduled analysis set.

The content of magnesium is monitored using the 285.213 nm and the content for titanium using 336.121 nm line. The content of aluminium is monitored via the 167.079 nm line, when Al concentration in test portion is between 0-10 wt % and via the 396.152 nm line for Al concentrations above 10 wt %.

The reported values are an average of three successive aliquots taken from the same sample and are related back to the original catalyst sample based on input of the original weight of test portion and the dilution volume into the software.

Chloride Content by Titration

Chloride contents in catalyst samples are measured by titration with silver nitrate. A test portion of 50-200 mg is weighed under nitrogen in a septum-sealed vial. A solution of 1 part of concentrated $HNO_3$ (68%, analytical grade) and 4 parts of freshly distilled water are added to the sample in an aliquot of 2.5 mL using a syringe. After the reaction and dissolution of the catalyst material, the solution is transferred into a titration cup using an excess of freshly distilled water. The solution is then immediately titrated with a commercially certified solution of 0.1 M $AgNO_3$ in a Mettler Toledo T70 automatic titrator. The titration end-point is determined using an Ag-electrode. The total chloride amount is calculated from the titration and related to the original sample weight.

Melt Flow Rate $MFR_2$: 190° C., 2.16 kg load $MFR_5$: 190° C., 5 kg load

The melt flow rate is measured in accordance with ISO 1133 and is indicated in g/10 min. MFR is an indication of the flowability and hence the processability of the polymer. The higher the melt flow rate, the lower the viscosity of the polymer.

Molecular Weight Averages, Molecular Weight Distribution (Mn, Mw, Mz, PDI, MWD)

Molecular weight averages (Mz, Mw and Mn), Molecular Weight Distribution (MWD) and its broadness, described by polydispersity index PDI=Mw/Mn (wherein Mn is the number average molecular weight and Mw is the weight average molecular weight) are determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i / M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3×Agilent-PLgel Olexis and 1×Agilent-PLgel Olexis Guard columns is used. As the solvent and mobile phase 1,2,4-trichlorobenzene (TCB) stabilised with 250 mg/L 2,6-Di-tert-butyl-4-methyl-phenol) is used. The chromatographic system is operated at 160° C. and at a constant flow rate of 1 mL/min. 200 μL of sample solution is injected per analysis. Data collection is performed using either Agilent Cirrus software version 3.3 or PolymerChar GPC-IR control software.

The column set is calibrated using universal calibration (according to ISO 16014-2:2003) with 19 narrow MWD polystyrene (PS) standards in the range of 0.5 kg/mol to 11 500 kg/mol. The PS standards are dissolved at room temperature over several hours. The conversion of the polystyrene peak molecular weight to polyolefin molecular weights is accomplished by using the Mark Houwink equation and the following Mark Houwink constants:

$K_{PS}=19 \times 10^{-3}$ mL/g, $\eta_{PS}=0.655$ $K_{PE}=39 \times 10^{-3}$ mL/g, $\eta_{PE}=0.725$ $K_{PP}=19 \times 10^{-3}$ mL/g, $\eta_{PP}=0.725$ A third order polynomial fit is used to fit the calibration data.

All samples are prepared in the concentration range of 0.5-1 mg/ml and dissolved at 160° C. for 2.5 hours for PP or 3 hours for PE under continuous gentle shaking.

Melt Temperature

Melt temperature is measured by Differential Scanning calorimeter (DSC) according to ISO 11357 using Mettler DSC2 Differential Scanning calorimeter (DSC) on 5-10 mg samples.

Co-Monomer Content in PE by FTIR Spectroscopy

Co-monomer content is determined based on Fourier transform infrared spectroscopy (FTIR) using Bruker Tensor 37 spectrometer together with OPUS software.

Approximately 0.3 grams of sample is compression-moulded into films with thickness of 250 μm. Silicone paper is used on both sides of the film. The films are not touched by bare hands to avoid contamination. The films are pressed by using Fontijne Press model LabEcon 300. The moulding is carried out at 160° C. with 2 min pre-heating+2 min light press+1 min under full press. The cooling is done under full press power for 4 minutes.

The butene co-monomer content is determined from the absorbance at the wave number of approximately 1378 $cm^{-1}$ and the reference peak is 2019 $cm^{-1}$. The analysis is performed using a resolution of 2 $cm^{-1}$, wave number span from 4000 to 400 $cm^{-1}$ and the number of sweeps of 128. At least two spectra are obtained from each film.

The co-monomer content is determined from a spectrum from the wave number range of 1400 $cm^{-1}$ to 1330 $cm^{-1}$. The baseline is determined using the following method: within the set wavenumber range, the highest peak is located and then the minima to the left and to the right of this highest peak. The baseline connects these minima. The absorbance value at the highest peak is divided by the area of the reference peak.

The calibration plot for the method is produced for each co-monomer type separately. The co-monomer content of an unknown sample needs to be within the range of the co-monomer contents of the calibration samples. The co-monomer content in the calibration sample materials is pre-determined by NMR-spectrometry.

The co-monomer content is calculated automatically by using calibration curve and the following formula:

$W_E = C_1 \times A_0 + C_0$ where $W_E$=result in wt %

$A_0$=absorbance of the measured peak $(A_Q)$ to the area of the reference peak $(A_R)$;

$C_1$=slope of the calibration curve;

$C_0$=offset of the calibration curve.

The co-monomer content is determined from both of the obtained spectra, and the value is calculated as the average of these results.

EXAMPLES

Raw Materials

The standard 10 and 25 wt % TEA (triethylaluminium) solutions in heptane were prepared by dilution of 100% TEA-S from Chemtura.

$MgCl_2*3EtOH$ carrier was received from Grace with the properties as indicated in Table 1.

TABLE 1

| $MgCl_2*3EtOH$ carrier. | |
|---|---|
| Carrier | irregular |
| Mg (wt %) | 10.4 |
| Ethanol (wt %) | 57.6 |
| EtOH/Mg (mol/mol) | 2.93 |
| D[v, 10] (μm) | 7.9 |
| D[v, 50] (μm) | 17.0 |
| D[v, 90] (μm) | 31.1 |

2,2-Di(2-tetrahydrofuryl)propane (DTHFP) was supplied by TCI EUROPE N.V. as a mixture (1:1) of diastereomers (D,L-(rac)-DTHFP and meso-DTHFP.

Ethyl tetrahydrofurfuryl ether (or ETE or 2-(ethoxymethyl)tetrahydrofuran; CAS: 62435-71-6) was supplied by Sigma-Aldrich.

$TiCl_4$ was supplied by Sigma-Aldrich (Metallic impurities <1000 ppm, Metals analysis >99.9%).

In the following examples preparation of the comparative and inventive catalyst components, as well as use of the catalysts in the polymerisations, are described. Catalysts and polymer properties are disclosed in Table 2.

Comparative Example 1 (CE1)

The catalyst component was prepared following the preparation similar to the procedure described in WO2016097193.

DTHFP as an internal organic compound was added just before the addition of TEA.

A. Pre-Treated Support Material Preparation:

In an inert atmosphere glovebox (<1 ppm $O_2$, $H_2O$): A dry 300 mL, 4-neck round-bottom flask equipped with two rubber sleeved septa, a thermometer and mechanical stirrer was charged with 7.01 g (30 mmol of Mg) of granular 17 μm $MgCl_2*3EtOH$ carrier. The flask was removed from the glovebox; a nitrogen inlet and outlet were fixed. The flask was placed in a 0° C. cooling bath and charged with a solution of 0.56 g of 2,2-Di(2-tetrahydrofuryl)propane (DTHFP/Mg=0.1 mol/mol) in 40 mL of heptane. The dispersion was stirred for approximately 10 min at 335 rpm. A 10 wt % solution of triethylaluminium (107.55 g, 94.2 mmol Al; Al/EtOH=1.0 mol/mol) in heptane was added drop-wise within 1 h, keeping the temperature below 5° C. The obtained suspension was heated to 80° C. in 20 min and kept at this temperature for 30 min at 335 rpm. The suspension was settled for 5 min at 80° C., and the liquid was siphoned off via a cannula. The obtained pre-treated support material was cooled to room temperature and washed with 170 mL of toluene at room temperature (addition of toluene, stirring at 335 rpm for 15 min, settling for 5 min, siphoning with a cannula).

B. Catalyst Component Preparation:

At room temperature, 70 mL of toluene was added to the pre-treated support material. The mixture was stirred for approximately 1 min at 335 rpm. Neat $TiCl_4$ (3.3 mL, 30 mmol; Ti/Mg=1.0 mol/mol) was added drop-wise, and the temperature was maintained between 25-35° C. The obtained suspension was heated to 90° C. within 20 min and kept at this temperature for 60 min at 335 rpm. The suspension was settled for 5 min at 90° C., and the liquid was siphoned off using a cannula. Heating was switched off and the obtained catalyst was washed twice with 70 mL of toluene (temperature of the mixture was allowed to slowly drop to room temperature throughout the washing steps by addition of ambient wash solvents) and once with 70 mL of heptane (addition of ambient toluene or heptane, stirring at 335 rpm for 15 min, settling for 5 min and siphoning off the liquids via a cannula). The catalyst was dried first in nitrogen flow at 70° C. and then in vacuo for ca. 0.5 h. The yield was 4.3 g (86.7%, Mg basis).

C. Bench-Scale Copolymerisation of Ethylene With 1-Butene

The catalyst component from Comparative Example 1 (6.6 mg) was tested in copolymerisation of ethylene with 1-butene. Triethylaluminum (TEA) was used as a co-catalyst with an Al/Ti molar ratio of 15. The polymerisation reaction was carried out in a 3 L bench-scale reactor in accordance with the following procedure:

An empty 3 L bench-scale reactor was charged with 70 mL of 1-butene at 20° C. and stirred at 200 rpm. Then, propane (1250 mL) was added to the reactor as a polymerisation medium, followed by the addition of hydrogen gas (0.40 bar). The reactor was heated to 85° C. and a batch of ethylene (3.7 bar) was added. The reactor pressure was kept at 0.2 bar of overpressure and stirring speed was increased to 550 rpm. The catalyst and the co-catalyst were added together (a few seconds of pre-contact between catalyst and TEA) to the reactor with additional 100 mL of propane. The total reactor pressure was maintained at 37.5 bar by continuous ethylene feed. The polymerisation was stopped after 60 min by venting off the monomers and $H_2$. The obtained polymer was left to dry in a fume hood overnight before weighing.

D. Polymerisation Results

The results of the polymerisation reaction are shown in Table 2. The activity of the catalyst was calculated based on the amount of polymer produced. Molecular weight and molecular weight distribution were measured by gel permeation chromatography (GPC). The butene-co-monomer content was measured by FTIR. The melting temperature of copolymer was measured by DSC.

Inventive Example 1 (IE1)

Ethyl tetrahydrofurfuryl ether as an internal organic compound was added just before the addition of TEA.

A. Pre-Treated Support Material Preparation:

In an inert atmosphere glovebox (<1 ppm $O_2$, $H_2O$): A dry 300 mL, 4-neck round-bottom flask equipped with two rubber sleeved septa, a thermometer and mechanical stirrer was charged with 7.01 g (30 mmol of Mg) of granular 17 μm $MgCl_2*3EtOH$ carrier. The flask was removed from the glovebox, a nitrogen inlet and outlet were fixed. The flask was placed in a 0° C. cooling bath and charged with a solution of 0.40 g of Ethyl tetrahydrofurfuryl ether (ETE/Mg=0.1 mol/mol) in 40 mL of heptane. The dispersion was stirred for approximately 10 min at 335 rpm. A 10 wt % solution of triethylaluminium (107.55 g, 94.2 mmol Al;

Al/EtOH=1.0 mol/mol) in heptane was added drop-wise within 1 h, keeping the temperature below 5° C. The obtained suspension was heated to 80° C. in 20 min and kept at this temperature for 30 min at 335 rpm. The suspension was settled for 5 min at 80° C., and the liquid was siphoned off via a cannula. The obtained pre-treated support material was cooled to room temperature and washed with 170 mL of toluene at room temperature (addition of toluene, stirring at 335 rpm for 15 min, settling for 5 min, siphoning with a cannula).

B. Catalyst Component Preparation:

At room temperature, 70 mL of toluene was added to the pre-treated support material. The mixture was stirred for approximately 1 min at 335 rpm. Neat $TiCl_4$ (3.3 mL, 30 mmol; Ti/Mg=1.0 mol/mol) was added drop-wise, and the temperature was maintained between 25-35° C. The obtained suspension was heated to 90° C. within 20 min and kept at this temperature for 60 min at 335 rpm. The suspension was settled for 5 min at 90° C., and the liquid was siphoned off using a cannula. Heating was switched off and the obtained catalyst was washed twice with 70 mL of toluene (temperature of the mixture was allowed to slowly drop to room temperature throughout the washing steps by addition of ambient wash solvents) and once with 70 mL of heptane (addition of ambient toluene or heptane, stirring at 335 rpm for 15 min, settling for 5 min and siphoning off the liquids via a cannula). The catalyst was dried first in nitrogen flow at 70° C. and then in vacuo for ca. 0.5 h. The yield was 3.9 g (93.9%, Mg basis).

C. Bench-Scale Copolymerisation of Ethylene With 1-Butene

The catalyst from Inventive Example 1 (7.0 mg) was tested in copolymerisation of ethylene with 1-butene. Triethylaluminum (TEA) was used as a co-catalyst with an Al/Ti molar ratio of 15. The polymerisation reaction was carried out in a 3 L bench-scale reactor in accordance with the procedure described in Comparative Example 1.

D. Polymerisation Results

The results of the polymerisation reaction are shown in Table 2. The activity of the catalyst was calculated based on the amount of polymer produced. Molecular weight and molecular weight distribution were measured by gel permeation chromatography (GPC). The butene-co-monomer content was measured by FTIR. The melting temperature of copolymer was measured by DSC.

TABLE 2

| Catalyst and co-polymer analysis | | |
|---|---|---|
| Example | CE1 | IE1 |
| Catalyst analysis | | |
| Mg (wt %) | 14.7 | 17.7 |
| Al (wt %) | 0.86 | 0.52 |
| Ti (wt %) | 6.78 | 6.69 |
| Cl (wt %) | 58.9 | 66.0 |
| Mg/Ti (mol/mol) | 4.27 | 5.21 |
| Mg/Al (mol/mol) | 18.98 | 37.79 |
| Cl/Ti (mol/mol) | 11.7 | 13.3 |
| Polymerisation* | | |
| Activity ($kg_{PO}/g_{cat}/h$) | 17.9 | 20.9 |
| Polymer | | |
| Mw | 221500 | 236500 |
| PDI | 4.38 | 3.80 |

TABLE 2-continued

| Catalyst and co-polymer analysis | | |
|---|---|---|
| Example | CE1 | IE1 |
| $C_4$ content (wt %) | 4.9 | 4.4 |
| $T_m$ (° C.) | 121.60 | 121.60 |

*Under test copolymerisation conditions: T = 85° C., $C_2$ = 5 mol %, $H_2C_2$ = 20 mol/kmol, $C_4/C_2$ = 970 mol/kmol, t = 1 h, Al/Ti = 15 mol/mol As can be seen from the results, the catalyst activity and molecular weight of polymer produced by the inventive example IE1 is higher than in the comparative example CE1. At the same time, the MWD is narrower (much lower PDI, FIG. 1), the co-monomer content is lower for the same melting temperature, indicating an advantageously more even distribution of incorporated co-monomer in case of IE1. The morphology of the exemplified catalysts is similarly uniform.

The invention claimed is:

1. A method for producing a solid $MgCl_2$ supported catalyst component, the method comprising the steps of:
   a) providing solid carrier particles of $MgCl_2*mROH$ adduct, wherein R is a linear or branched alkyl group with 1 to 12 C atoms, and m is 0 to 6;
   b) pre-treating the solid carrier particles of step a) with a compound comprising a Group 13 metal;
   c) treating pre-treated solid carrier particles of step b) with a compound comprising a transition metal of Group 4 to 6; and
   d) recovering the solid $MgCl_2$ supported catalyst component from step c),
   wherein the solid carrier particles are contacted with an internal organic compound of formula (I) before treating solid carrier particles in step c)

(I)

wherein in formula (I):
$R_1$ is a linear or branched $C_2$ to $C_6$-alkyl group.

2. The method according to claim 1, wherein the solid carrier particles are contacted with the internal organic compound of formula (I) before step b).

3. The method according to claim 1, wherein the solid carrier particles are contacted with the internal organic compound of formula (I) simultaneously with step b) and/or after step b) but before step c).

4. The method according to claim 1, wherein in formula (I) $R_1$ is a linear or branched $C_2$ to $C_4$-alkyl group.

5. The method according to claim 1, wherein $R_1$ is an ethyl group.

6. The method according to claim 1, wherein the internal organic compound of formula (I) is an internal electron donor selected from the group consisting of ethyl tetrahydrofurfuryl ether, n-propyl tetrahydrofurfuryl ether, isopropyl tetrahydrofurfuryl ether, n-butyl tetrahydrofurfuryl ether, sec-butyl tetrahydrofurfuryl ether, tert-butyl tetrahydrofurfuryl ether, and mixtures thereof.

7. The method according to claim 6, wherein the internal organic compound of formula (I) is ethyl tetrahydrofurfuryl ether.

8. The method according to claim 1, wherein R in the MgCl$_2$*mROH adduct is a linear or branched alkyl group containing 1 to 8 C atoms, and m is 1 to 4.

9. The method according to claim 8, wherein R in the MgCl$_2$*mROH adduct is a linear or branched alkyl group containing 1 to 4 C atoms.

10. The method according to claim 8, wherein m is 2.7 to 3.3.

11. The method according to claim 1, wherein the compound comprising the Group 13 metal is an aluminum compound of the formula $$Al(alkyl)_xX_{3-x} \quad (II)$$

wherein
each alkyl is independently a linear, branched or cyclic alkyl group of 1 to 12 C-atoms,
X is halogen, preferably chlorine, and
$1 < x \leq 3$.

12. The method according to claim 11, wherein each alkyl is independently a linear, branched or cyclic alkyl group of 1 to 8 C-atoms.

13. The method according to claim 11, wherein each alkyl is independently a linear, branched or cyclic alkyl group of 1 to 6 C-atoms.

14. The method according to claim 11, wherein X is chlorine.

15. The method according to claim 1, wherein the compound comprising the Group 13 metal is selected from the group consisting of dialkylaluminum chlorides and trialkylaluminum compounds.

16. The method according to claim 15, wherein the compound comprising the Group 13 metal is selected from the group consisting of dimethylaluminum chloride, diethylaluminum chloride, diisobutylaluminum chloride, a triethylaluminium compound, and mixtures thereof.

17. The method according to claim 15, wherein the compound comprising the Group 13 metal is a trialkylaluminum compound.

18. The method according to claim 15, wherein the compound comprising the Group 13 metal is a triethylaluminium compound.

19. The method according to claim 1, wherein no other Mg compounds are used in the production of the solid MgCl$_2$ supported catalyst component—other than the MgCl$_2$*mROH adduct.

20. A solid MgCl$_2$ supported catalyst component prepared by the method of claim 1.

21. The solid MgCl$_2$ supported catalyst component according to claim 20, wherein the solid catalyst component has a Mg/Ti mol/mol ratio of 1 to 10, and a Mg/Al ratio of >10.

22. The solid MgCl$_2$ supported catalyst component according to claim 21, wherein the solid catalyst component has a Mg/Ti mol/mol ratio of 2 to 8.

23. A catalyst comprising the solid MgCl$_2$ supported catalyst component of claim 20, a co-catalyst, and optionally an external additive, wherein the co-catalyst comprises a compound comprising a Group 13 metal.

24. A process for producing an ethylene copolymer in a polymerization process comprising:
polymerizing ethylene with co-monomers selected from C$_3$-C$_{20}$-alpha-olefins
in the presence of the catalyst of claim 23.

25. The process of producing an ethylene copolymer of claim 24, wherein the polymerization process comprises at least two stages and at least one polymerization stage is carried out in a solution, slurry, gas phase reactor, or combinations thereof.

26. The process for producing an ethylene copolymer according to claim 24, wherein the co-monomers are selected from C$_4$-C$_{10}$-alpha-olefins.

27. A solid MgCl$_2$ supported catalyst component comprising Ti, Mg, Al, Cl, and an internal electron donor of formula (I):

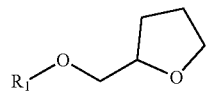

(I)

wherein in the formula (I), R$_1$ is a linear or branched C$_2$ to C$_6$-alkyl group; and
wherein the solid catalyst component has:
a Mg/Ti mol/mol ratio of 1 to 10,
a Mg/Al ratio of >10 mol/mol, and
a Cl/Ti mol/mol ratio of 4 to 40.

28. The solid MgCl$_2$ supported catalyst component according to claim 27, wherein R$^1$ is a linear or branched C$_2$ to C$_4$-alkyl group.

29. The solid MgCl$_2$ supported catalyst component according to claim 27, wherein R$^1$ is an ethyl group.

30. The solid MgCl$_2$ supported catalyst component according to claim 27, wherein the solid catalyst component has a Mg/Ti mol/mol ratio of 2 to 8.

31. The solid MgCl$_2$ supported catalyst component according to claim 27, wherein the solid catalyst component has a Mg/Al ratio of >16 mol/mol.

32. The solid MgCl$_2$ supported catalyst component according to claim 27, wherein the solid catalyst component has a Cl/Ti mol/mol ratio of 7 to 30.

* * * * *